(12) United States Patent
Gupta et al.

(10) Patent No.: US 10,783,073 B2
(45) Date of Patent: Sep. 22, 2020

(54) CHRONOLOGICALLY ORDERED OUT-OF-PLACE UPDATE KEY-VALUE STORAGE SYSTEM

(71) Applicant: International Business Machines Corporation, Armonk, NY (US)

(72) Inventors: Aayush Gupta, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 15/904,186

(22) Filed: Feb. 23, 2018

(65) Prior Publication Data

US 2019/0266081 A1 Aug. 29, 2019

(51) Int. Cl.
G06F 7/00 (2006.01)
G06F 12/02 (2006.01)
G06F 16/23 (2019.01)

(52) U.S. Cl.
CPC .......... *G06F 12/0253* (2013.01); *G06F 16/23* (2019.01); *G06F 16/2358* (2019.01); *G06F 16/2365* (2019.01)

(58) Field of Classification Search
CPC .................. G06F 16/1727; G06F 12/0253
USPC ........................................... 707/813
See application file for complete search history.

(56) References Cited

U.S. PATENT DOCUMENTS

| | | | |
|---|---|---|---|
| 5,996,054 A | 11/1999 | Ledain et al. | |
| 6,728,738 B2 | 4/2004 | Wolczko et al. | |
| 7,200,623 B2 | 4/2007 | Chandrasekaran et al. | |
| 7,747,565 B2 | 6/2010 | Harris et al. | |
| 7,861,237 B2 | 12/2010 | Tarditi, Jr. et al. | |
| 8,683,262 B1 | 3/2014 | Subbiah et al. | |
| 8,880,787 B1 | 11/2014 | Kimmel et al. | |
| 9,003,159 B2 * | 4/2015 | Deshkar | G06F 12/0246 707/813 |
| 9,021,421 B1 * | 4/2015 | Corry | G06F 12/0253 707/813 |
| 9,092,238 B2 | 7/2015 | Cavage et al. | |
| 9,268,653 B2 | 2/2016 | Kimmel et al. | |
| 9,400,816 B1 | 7/2016 | Gubarev et al. | |
| 9,594,842 B2 | 3/2017 | Pope et al. | |
| 9,697,267 B2 | 7/2017 | Kadayam et al. | |

(Continued)

FOREIGN PATENT DOCUMENTS

| | | |
|---|---|---|
| CN | 104063635 A | 9/2014 |
| CN | 105677297 A | 6/2016 |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Alexandria Y Bromell
(74) *Attorney, Agent, or Firm* — Sherman IP LLP; Kenneth L. Sherman; Steven Laut

(57) ABSTRACT

One embodiment provides a method including storing a key-value store in a memory. Out-of-place operations are performed to maintain chronological ordering of the operations by enforcing ordering of the operations on a storage layer in presence of a garbage collection transaction without an explicit secondary index.

20 Claims, 12 Drawing Sheets

(56) References Cited

U.S. PATENT DOCUMENTS

| | | | |
|---|---|---|---|
| 2007/0136290 | A1 | 6/2007 | Shinnar et al. |
| 2009/0210429 | A1 | 8/2009 | Agrawal et al. |
| 2010/0332240 | A1 | 12/2010 | Somouh et al. |
| 2012/0011106 | A1* | 1/2012 | Reid .................. G06F 9/466 707/695 |
| 2012/0102298 | A1 | 4/2012 | Sengupta et al. |
| 2013/0019000 | A1 | 1/2013 | Markus et al. |
| 2013/0036136 | A1 | 2/2013 | Horii |
| 2013/0086018 | A1 | 4/2013 | Horii |
| 2013/0151892 | A1 | 6/2013 | Huang et al. |
| 2014/0136575 | A1 | 5/2014 | Zhao et al. |
| 2014/0325115 | A1 | 10/2014 | Ramsundar et al. |
| 2016/0110403 | A1 | 4/2016 | Lomet et al. |
| 2016/0110408 | A1 | 4/2016 | Madhavarapu et al. |
| 2016/0246830 | A1* | 8/2016 | Chiu .................. G06F 16/1734 707/707 |
| 2017/0068599 | A1 | 3/2017 | Chiu et al. |
| 2017/0177617 | A1 | 6/2017 | Johnson et al. |
| 2018/0089034 | A1 | 3/2018 | Chiu et al. |
| 2019/0057027 | A1* | 2/2019 | D'Halluin .......... G06F 12/0253 707/707 |

OTHER PUBLICATIONS

Anonymous, "Using a Change Stream that is not Completely Ordered in a Replication System that Depends on Receiving Changes in Chronological Order," Sep. 9, 2014, pp. 1-6, ip.com, United States.

IBM, "Method to Chronologically Store and Manage Information, Chronological Database," Jan. 4, 2006, pp. 1-3, ip.com, United States.

Anonymous, "Crash-Consistent Clustered Storage System's Minimal Instruction Set Logging," Feb. 6, 2016, pp. 1-4, ip.com, United States.

Lomet, D., et al., "Efficient Transparent Application Recovery in Client-Server Information Systems," SIGMOD, 1998, pp. 460-471, Seattle, WA.

Anonymous, "Method and System for Collecting Garbage of a Persistent Change Log of a Memory Data Structure," Mar. 24, 2014, pp. 1-2, ip.com, United States.

Anonymous, "Processing for Efficient Triggering of Soft Real-Time Java Garbage Collection to Optimize Throughput, Latency and Power Consumed," Jan. 29, 2011, pp. 1-3, ip.com, United States.

IBM, "A Method for Improved Co-location of Objects in a Hierarchical Scanning Garbage Collector," Jan. 7, 2010, pp. 1-5, ip.com, United States.

Bailey, K. et al., "Exploring Storage Class Memory with Key Value Stores," INFLOW, Nov. 3, 2013, pp. 1-8, ACM, United States.

Filed Feb. 23, 2018, U.S. Appl. No. 15/904,186.

Filed Feb. 23, 2018, U.S. Appl. No. 15/904,180.

Filed Feb. 23, 2018, U.S. Appl. No. 15/904,185.

International Search Report and Written Opinion dated Jun. 26, 2019 for International Application PCT /IB2019/051324 from National Intellectual Property Administration, pp. 1-9, Beijing China.

International Search Report and Written Opinion dated Jun. 26, 2019 for International Application PCT /IB2019/051323 from National Intellectual Property Administration, pp. 1-13, Beijing China.

International Search Report and Written Opinion dated Jul. 3, 2019 for International Application PCT /IB2019/051325 from National Intellectual Property Administration, pp. 1-8, Beijing China.

List of IBM Patents or Applications Treated as Related; Gupta, A. et al., U.S. Appl. No. 16/803,347, filed Feb. 27, 2020; Gupta, A. et al., U.S. Appl. No. 16/795,396, filed Feb. 19, 2020.

Keen, J.S. et al., "Extended ephemeral logging: log storage management for applications with long lived transactions." ACM Transactions on Database Systems (TODS), vol. 22, No. 1, Mar. 1, 1997, pp. 1-42.

Hammer, D., "Filestream garbage collection with AlwaysOn Availability Groups.", SQL Hammer, Apr. 11, 2014, pp. 1-9, downloaded from: https://www.sqlhammer.com/filestream-garbage-collection-with-alwayson-availability-groups/.

List of IBM Patents or Applications Treated as Related: Filed Feb. 23, 2018, U.S. Appl. No. 15/904,185, filed Feb. 23, 2018, U.S. Appl. No. 15/904,180.

* cited by examiner

CHRONOLOGICALLY ORDERED OUT-OF-PLACE UPDATE KEY-VALUE STORAGE SYSTEM

BACKGROUND

Typical log-structured storage systems store record data in temporal order in a "log." These typical systems allow basic primitive operations, such as insert, update, delete, read. Each update of data results in a new record being inserted at the tail of the "log." Each delete results in a tombstone object being inserted at the tail of the log. Additionally, background garbage collection process compacts the data reclaiming space that does not contain valid data.

SUMMARY

Embodiments relate to chronologically ordered out-of-place updates in a key-value storage system. One embodiment provides a method including storing a key-value store in a memory. Out-of-place operations are performed to maintain chronological ordering of the operations by enforcing ordering of the operations on a storage layer in presence of garbage collection transactional processing without an explicit secondary index.

These and other features, aspects and advantages of the present invention will become understood with reference to the following description, appended claims and accompanying figures.

DETAILED DESCRIPTION

Figure 1:
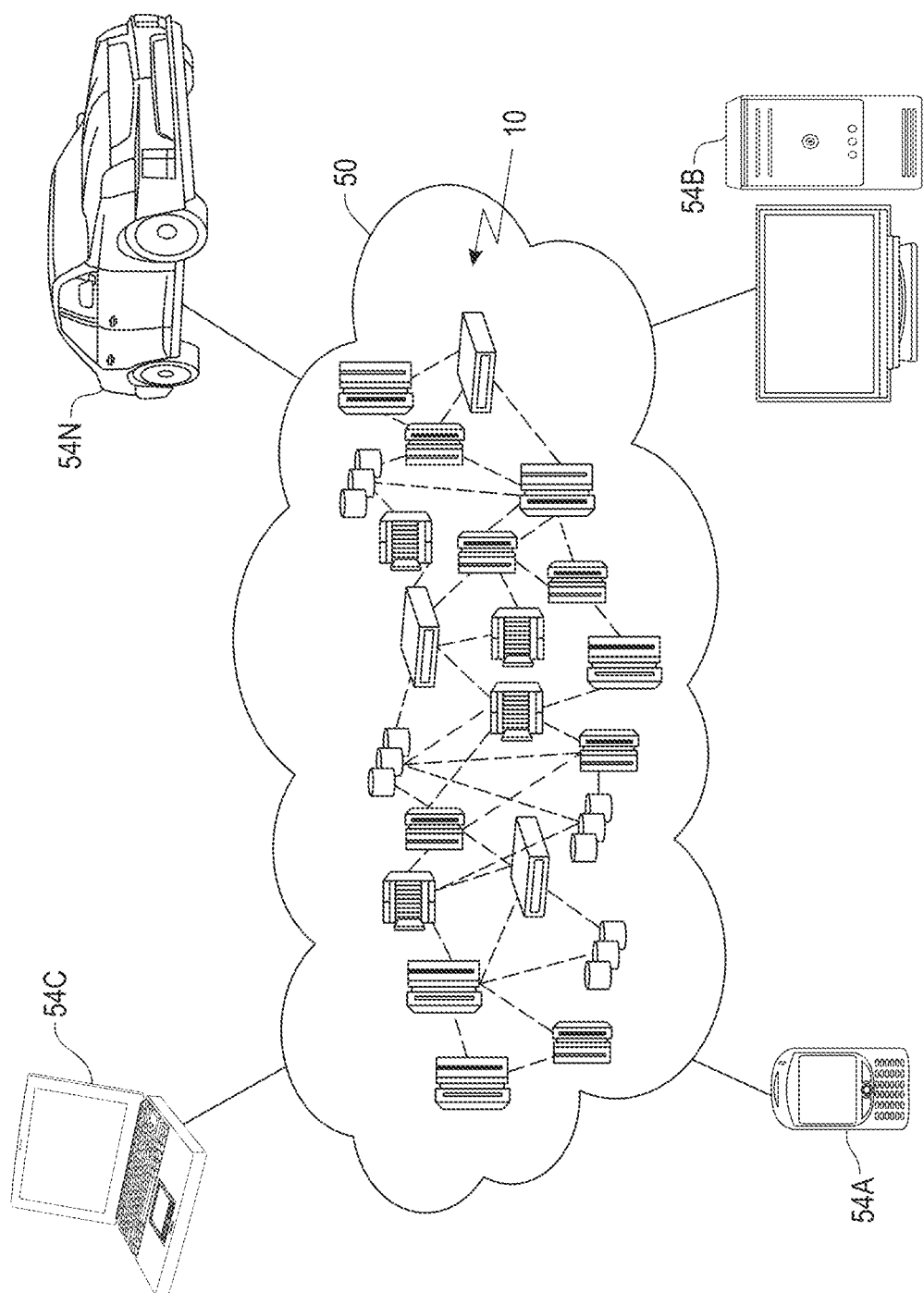
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments relate to chronologically ordered out-of-place updates in a key-value storage system. One embodiment provides a method including storing a key-value store in a memory. Out-of-place operations are performed to maintain chronological ordering of the operations by enforcing ordering of the operations on a storage layer in presence of GC transactional processing without an explicit secondary index.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
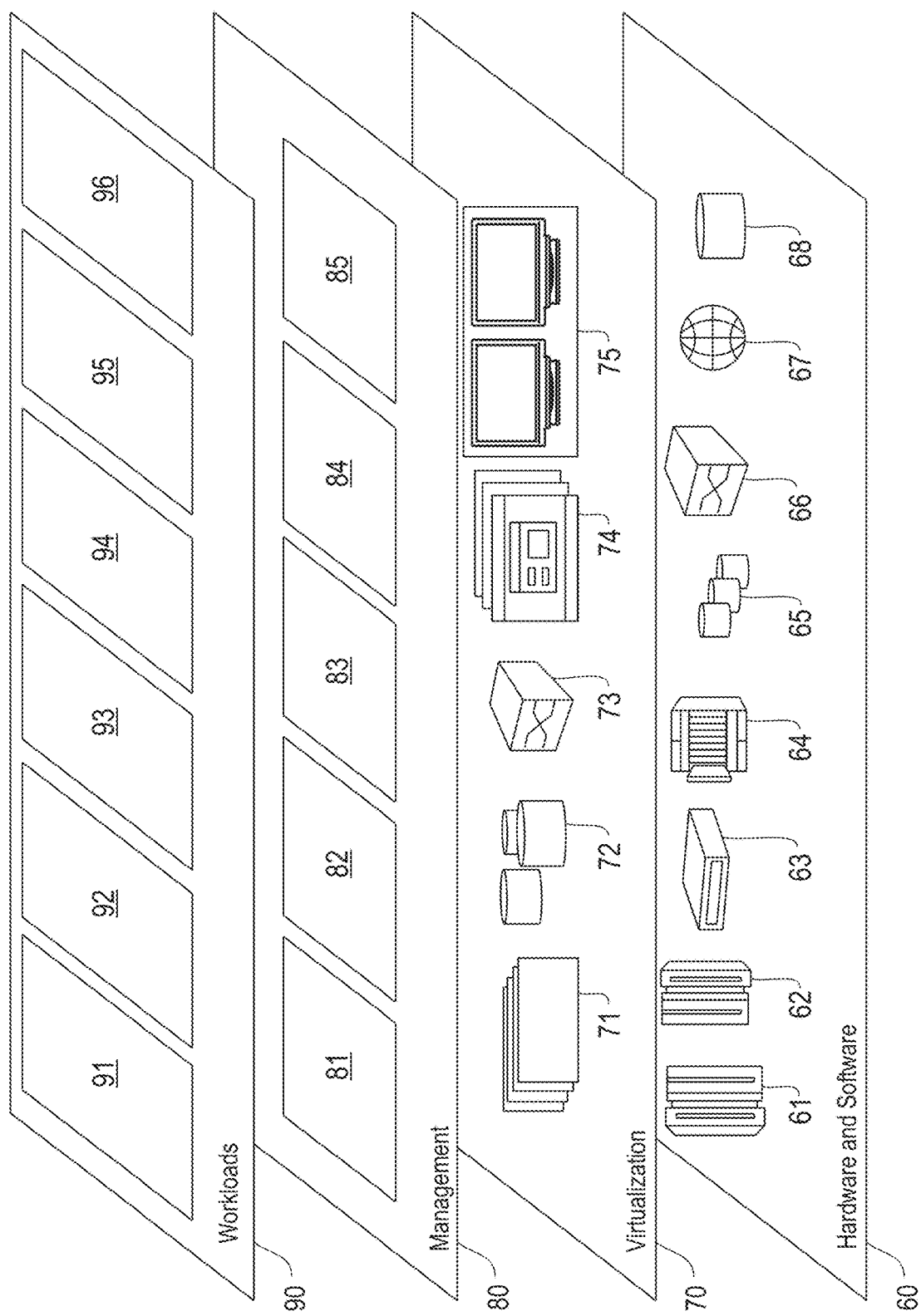
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chronologically ordered out-of-place updates in a key-value storage system processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
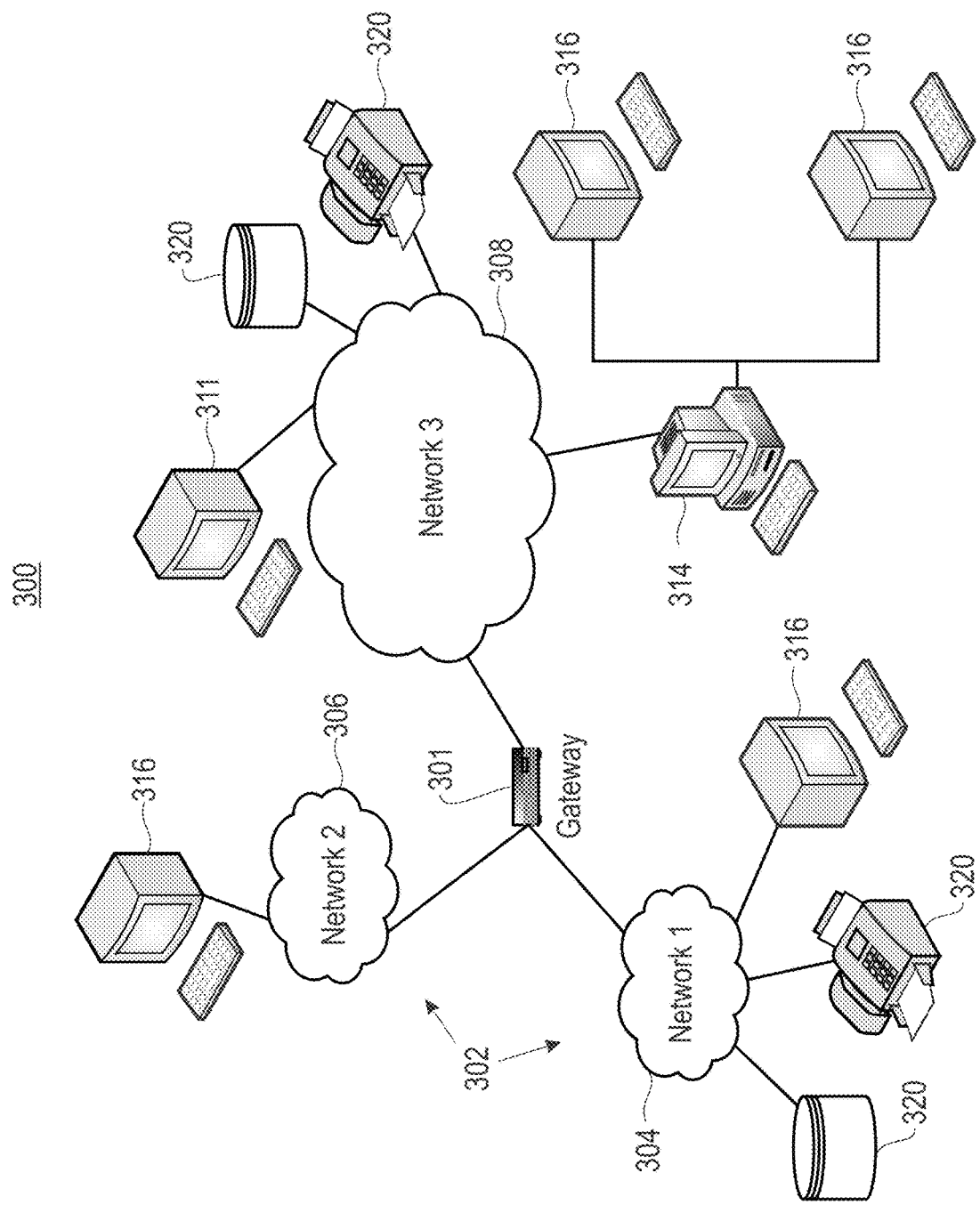
FIG. 3 is a network architecture for retrospective snapshots in log-structured storage systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
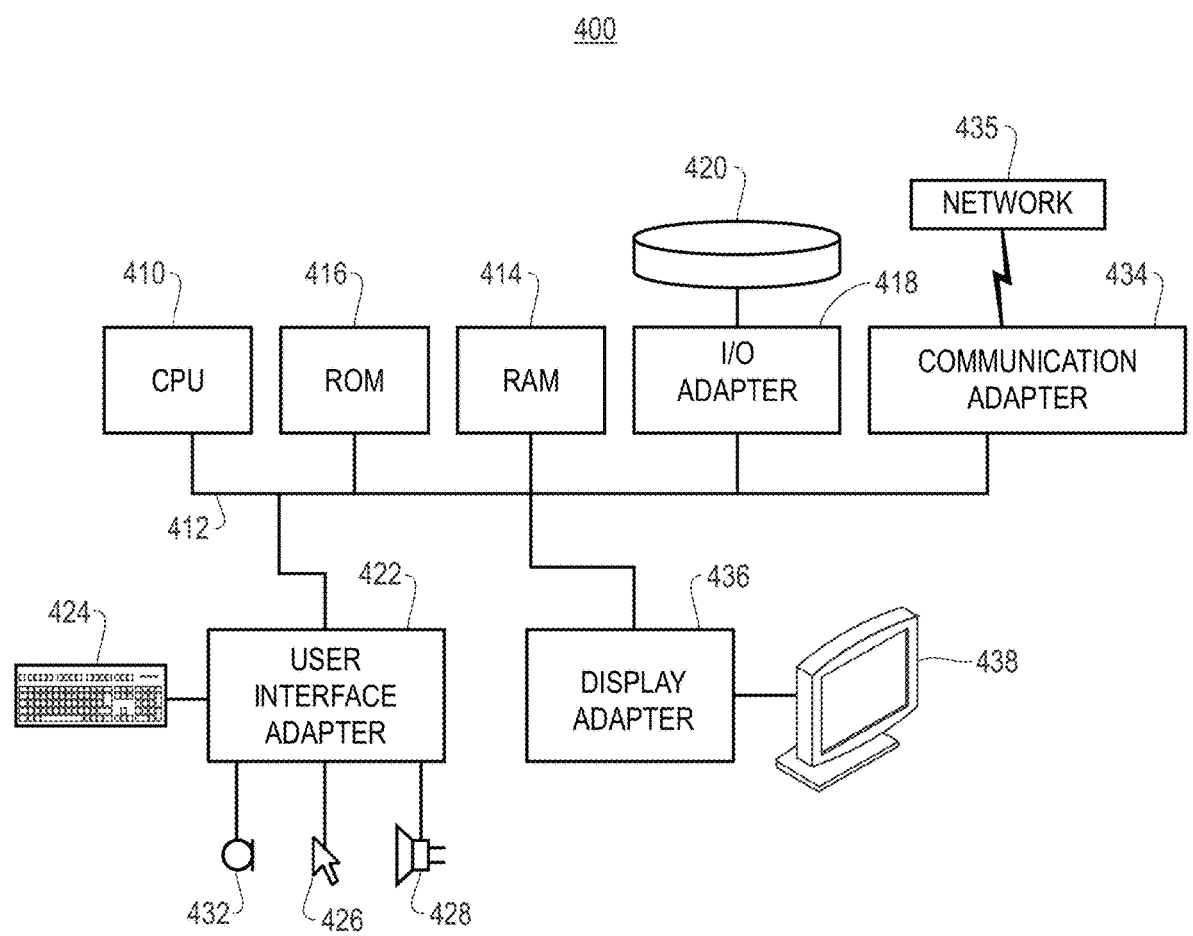
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
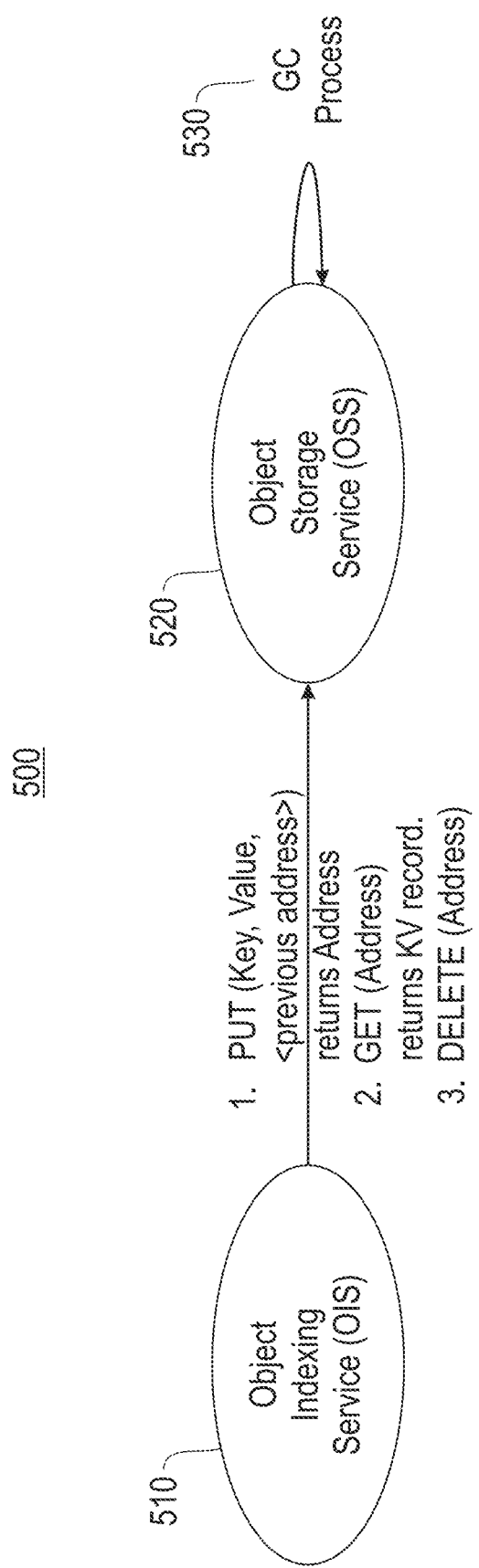
FIG. 5 illustrates an example key-value storage system for chronologically ordered out-of-place updates, according to an embodiment.

FIG. 5 illustrates an example key-value storage system 500 for chronologically ordered out-of-place updates, according to an embodiment. The term "garbage collection" (GC) refers to reclaiming "disk space" occupied by stale entries in the log. For example, when a record is inserted, an entry is added to the tail of the log. When the same record is deleted, a tombstone entry is added to the tail of the log. The tombstone entry refers to the original location of the data on disk as created by the insert. The disk space occupied by the original inserted record may be garbage collected (provided the system is not maintaining older versions). Stale data may be the result of records that have been deleted or updated. Updates result in stale data because older versions of the data that are maintained in the log are no longer needed. Note that in a log-structured store, every insert, update or delete operation results in a record being inserted at the tail of the log.

For log structured storage systems for small objects (e.g., a log structured key-value store), update operations are treated as new writes (append-only). Application programming interfaces (APIs) include: PUT, GET and DELETE. The PUT API returns back the address to the caller. The DELETE API results in insertion of a tombstone. Space occupied by deleted objects is reclaimed by the GC process. The object size is small (typically, 10s or 100s of bytes). GC granularity is large (MBs or GBs).

In system 500, an object indexing service (OIS) 510 performs PUT, GET and DELETE operations. In one embodiment, the format of the PUT operation is: PUT (key, value, <previous address>, which returns address. In one embodiment, the format of the GET operation is: GET (Address), which returns Key-value record. In one embodiment, the format of the DELETE operation is: DELETE (address). The output or returned value from the OIS 510 is input into the object storage service (OSS) 520, which is used for a GC process 530. In one embodiment, the OIS 510 and the OSS 520 may or may not be collocated. The OIS 510 and the OSS 520, even if co-located may be part of different processes. In one example embodiment, a key is exposed to the OSS 520.

In one embodiment, the GC process 530 is performed as a transaction. Transaction processing divides information processing into individual, indivisible operations known as transactions. Each transaction must succeed or fail as a complete unit, and can never be only partially complete.

Figure 6:
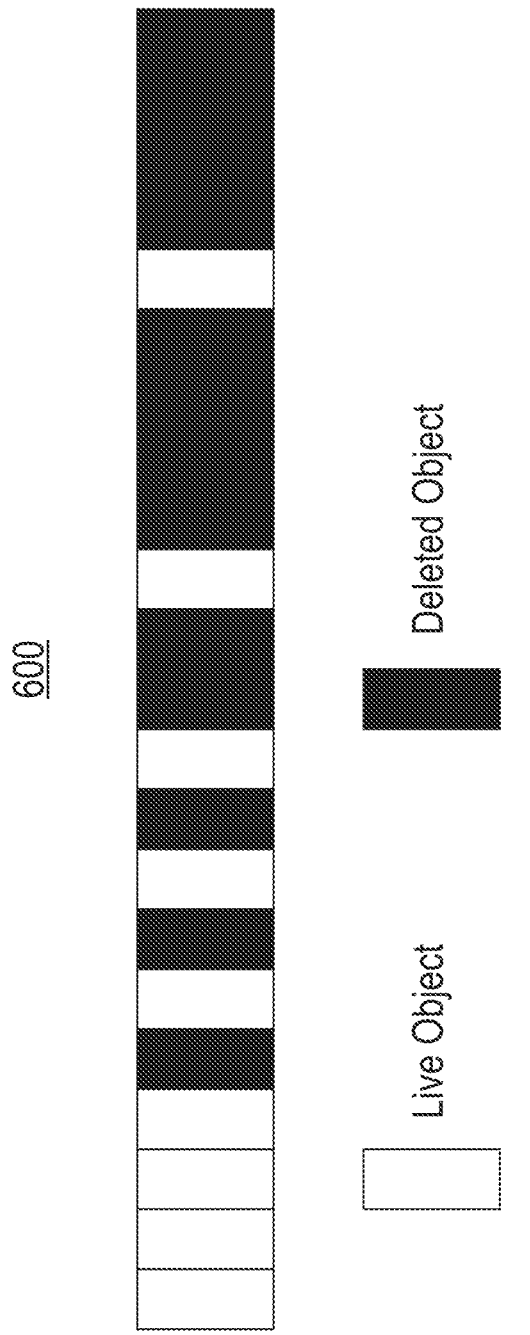
FIG. 6 illustrates an example of garbage collection (GC) object granularity, according to an embodiment.

FIG. 6 illustrates an example 600 of GC object granularity, according to an embodiment. Ad-hoc deletion results in fragmentation of space and poor utilization. GC process 530 (FIG. 5) granularity>>object granularity. GC process 530 of a slot requires live objects to be relocated.

Returning to FIG. 5, the system 500 retains chronological order of operations as follows. In one embodiment, chronological ordering provides for the ability to iterate the key-value store in the order in which the keys are inserted/updated in the store without an explicit secondary index. Since the store is out-of-place updated, all writes/updates may be performed in the chronological order. Chronological ordering of data is important in order to efficiently support functionality such as "change capture feed." For example, to support queries such as "list all valid changes since." Such a query should list only valid (i.e., not deleted records) but should list them in chronological order. Retaining chronological order is also useful for failure recovery if the append-only data store is being treated as a log. Chronological order is difficult to maintain while supporting delete/update operations and performing GC process 530 to retain valid records. In one example, a problem is that conventional GC processing of invalid key-value pairs will re-order the data, breaking chronological order. In one embodiment, system 500 provides a mechanism to maintain chronological order of keys in the presence of GC process 530 without maintaining a secondary index.

In one embodiment, system 500 provides for chronological ordering without secondary index by implementing the following. System 500 performs writes, updates and deletes in the order in which operations are issued by the upper layer. In one embodiment, system 500 maintains this information implicitly by performing the operations in a logically increasing order at the storage layer (e.g., in a log-structured order). Typical GC processing will break this implicit ordering.

Figure 7:
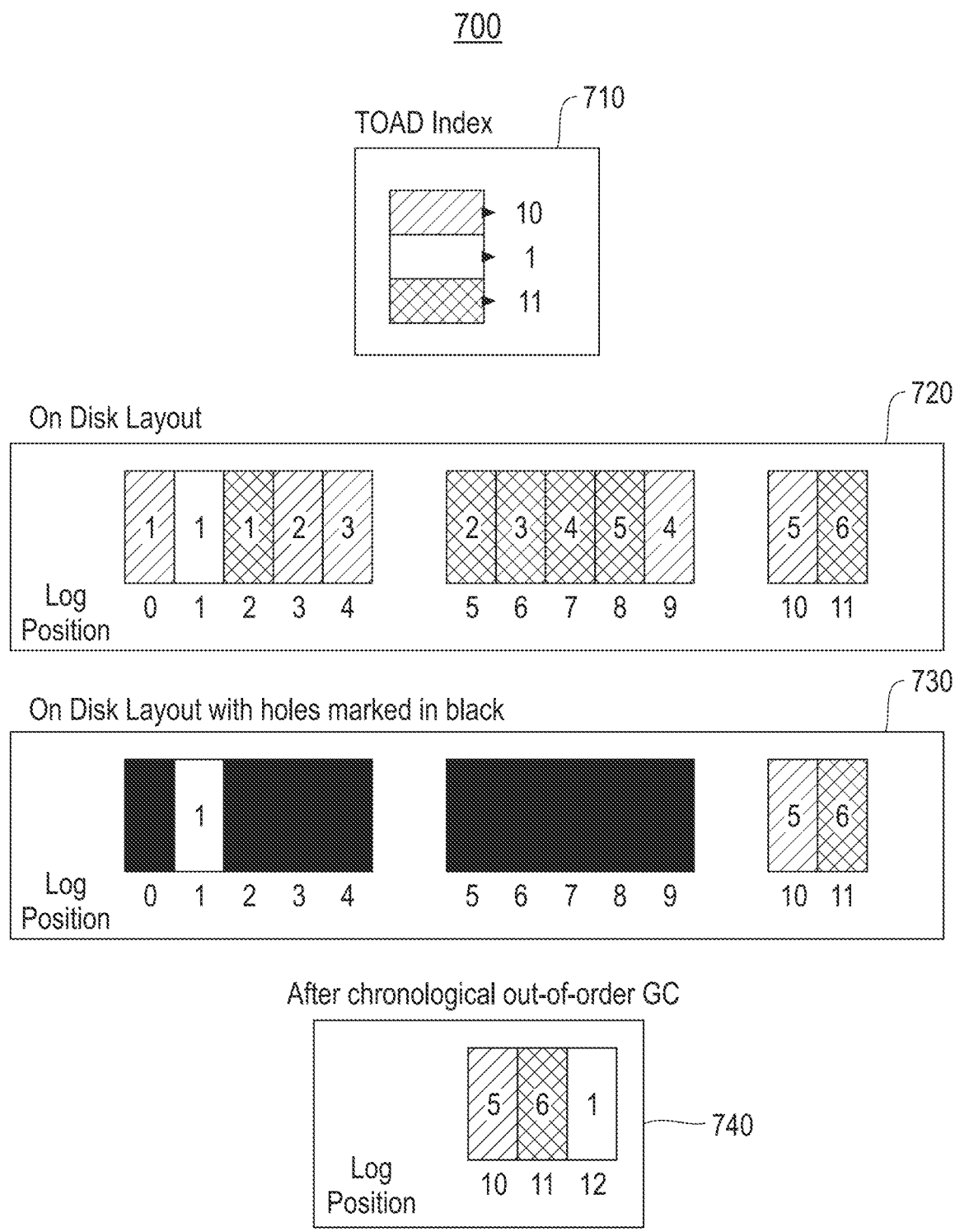
FIG. 7 illustrates an example of a GC break of chronological order, according to an embodiment.

FIG. 7 illustrates an example 700 of a GC break of chronological order, according to an embodiment. As shown, the example 700 includes index 710, on disk layout 720 (showing log position), on disk layout 730 with holes marked, and log position 740 after chronological out-of-order GC. The out-of-order GC includes garbage collecting the first slot (0-4) and writing the valid content at position 1 after position 11 leads to non-chronological ordering. This results in the log position 740 having positions 10, 11 and 12 with keys 5, 6 and 1 (out of chronological order).

Figure 8:
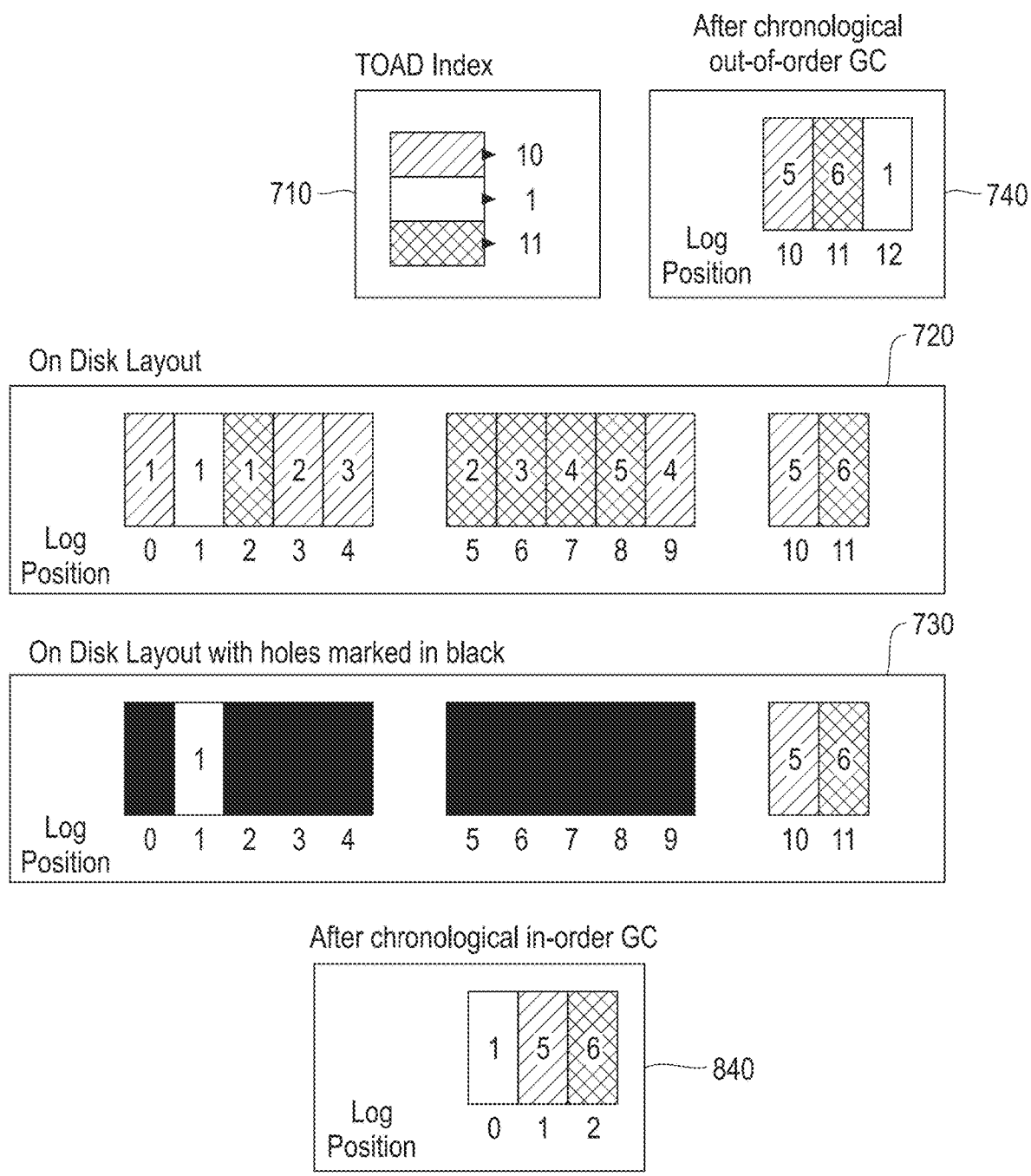
FIG. 8 illustrates an example of a chronological in-order GC, according to an embodiment.

FIG. 8 illustrates an example 800 of a chronological in-order GC, according to an embodiment. As shown, using the system 500 (FIG. 5), after processing chronological in-order-GC, the log position 840 shows the results for log positions 0, 1, and 2 including the in-order of keys 1, 5 and 6. The in-order-GC includes garbage collecting the first slot (0-4) and writing the valid content at position 1 to maintain the ordering. Internal ordering includes maintaining relative ordering of keys copied from the victim slot as before GC. External ordering includes maintaining relative ordering of keys copied from the victim slot the same as compared to the rest of the keys in other slots as before GC.

Figure 9A:
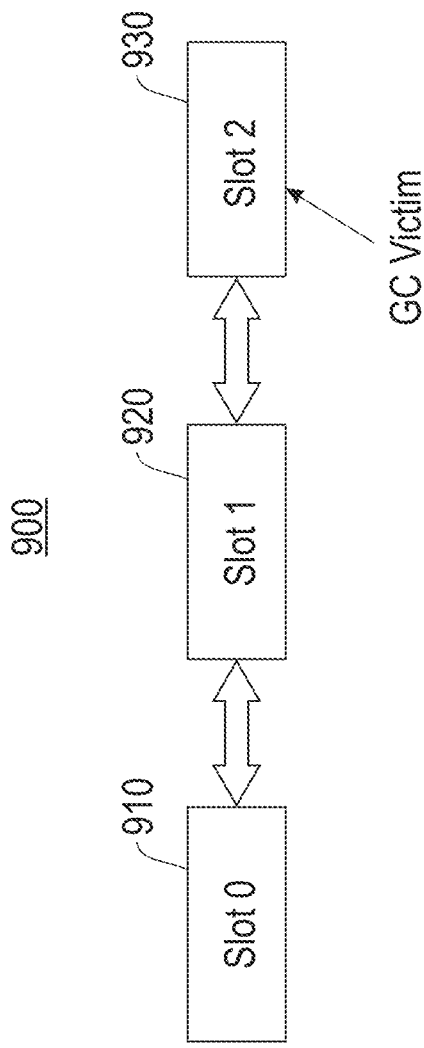
FIG. 9A illustrates an example of slots including a GC victim slot, according to an embodiment.
Figure 9B:
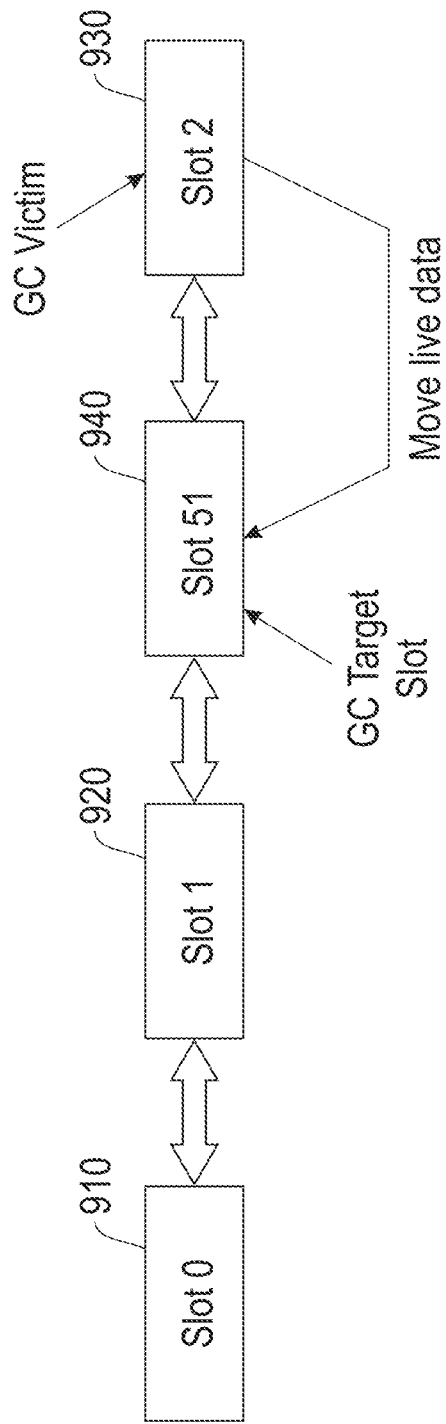
FIG. 9B illustrates an example of slots including a GC target slot, according to an embodiment.

FIG. 9A illustrates an example 900 of slots including a GC victim slot 930 (slot 2), according to an embodiment. The example 900 includes slot 0 910, slot 1 920 and slot 2 930, which is the GC victim slot. FIG. 9B shows example 900 including a GC target slot (slot 51 940), according to an embodiment. In this example 900, the GC victim (slot 2 930) where live data is moved to the GC target slot (slot 51 940). In the approach showed by example 900, a tombstone record has the format of: <TOMBSTONE, key, prior address>. The prior address refers to the last valid address for the key. A data record has the format of: "Address x": <DATA, key, value, prior address ("Address x–n")>, where x and n are positive integers. When a data record is moved, the following new records are inserted:<DATA, key, value, "Address x">, <TOMBSTONE, key, "Address x–n">.

Figure 10A:
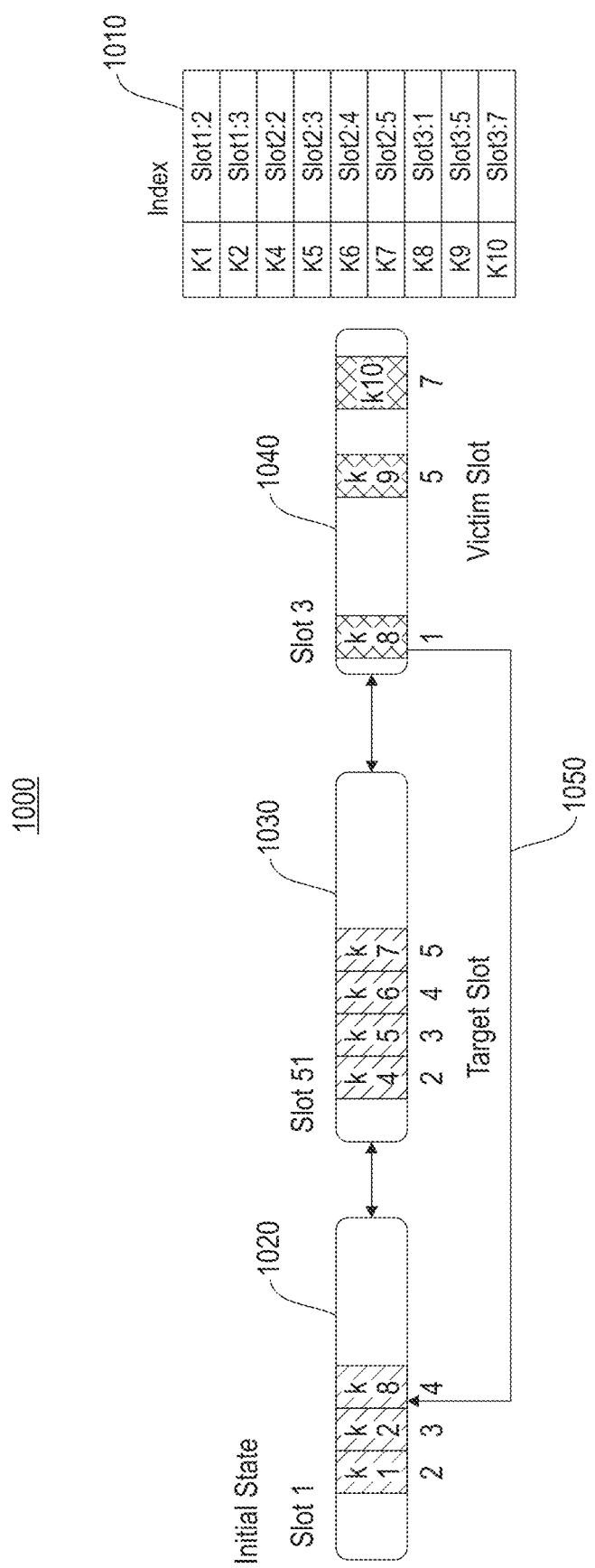
FIG. 10A illustrates an example initial state of a target slot and a victim slot prior to GC, according to an embodiment.
Figure 10B:
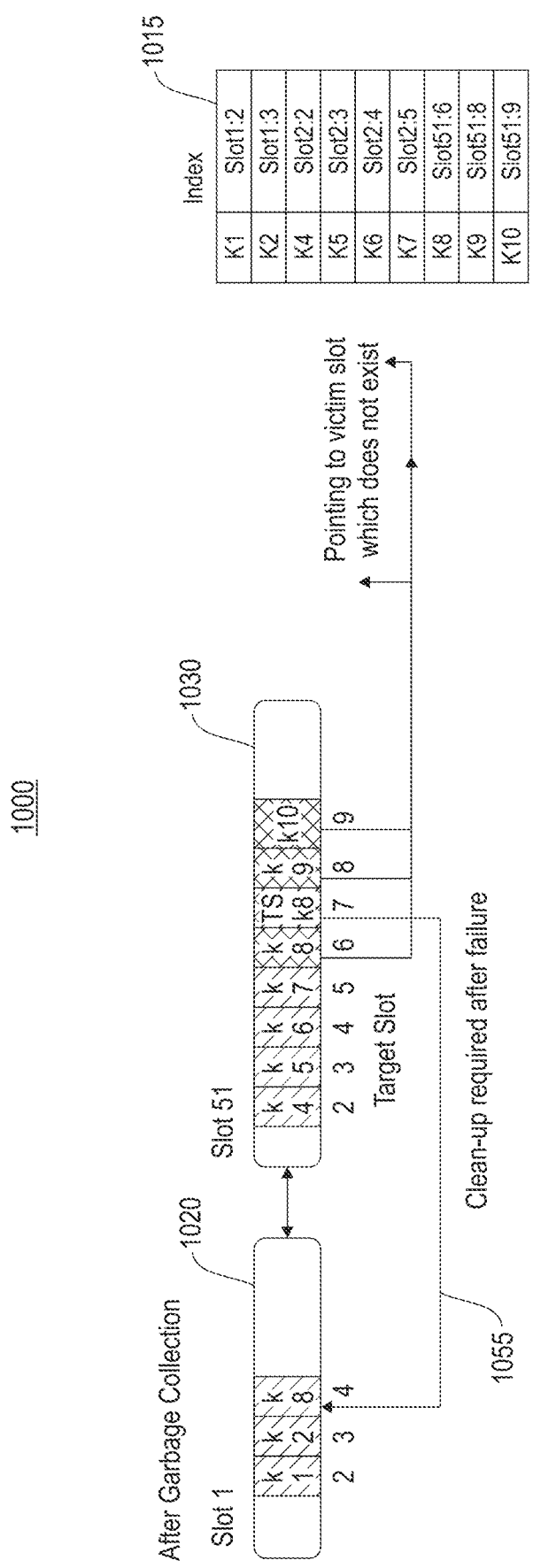
FIG. 10B illustrates an example state of a target slot after GC, according to an embodiment.

FIG. 10A illustrates an example 1000 initial state of a target slot (slot 51 1030) and a victim slot (slot 3 1040) prior to GC, according to an embodiment. The example 1000 shows slot 1 1020, slot 51 1030 (target slot), slot 3 1040 (victim slot) and key-value index 1010. Also shown is a back-pointer 1050 shown from slot 3 1040 position 1 (K8) to slot 1 1020 position 4 (k8). FIG. 10B illustrates the example 1000 state of the target slot (slot 51 1030) after GC, according to an embodiment. As shown, the key-value index 1010 is modified to key-value index 1015, which shows the modification of K8, K9 and K10 to slot 51:6, slot 51:8 and slot 51:9, respectively. Slot 51 1030 now includes the target slot at position 7 (K8) that points to the victim slot (slot 3 1040, which now does not exist; which is the same for positions 7, 8 and 9). Additionally, cleanup is required after GC failure (e.g., incomplete transaction). The back-pointer (points to previous address) 1055 points from position 7 of slot 51 1030 to position 4 of slot 1 1020.

In one embodiment, in-order chronological GC processing includes the following. (1) The system 500 (FIG. 5) selects a victim slot (e.g., slot 3 1040). In one embodiment, victim slot selection is based on system "cost-benefit" (i.e., processing time, bandwidth, memory usage, etc.) analysis, sequential slot selection, etc. Next, (2) the system 500 estimates the amount of live data in the victim slot. (3) The target slot(s) (e.g., slot 51 1030) are then identified. If a prior slot has free capacity, the target slot is identified as the prior slot of the victim slot. Otherwise, if more valid content needs to be copied, system 500 selects a free slot as a target slot (assign next logical slot identifier (ID)) and insert it before the victim slot in the slot chain. (4) System 500 then records the beginning of the GC transaction in the recovery log. (5) The valid content is then copied from the victim slot to the target slot. This includes placing a tombstone if the record being copied is an update (needed so that the original insert remains invalid and does not show up), where the tombstone points to where the update back-pointer is pointing to in the victim slot. The back-pointer for entries in the GC target slot should point to the victim slot. The valid content includes "live data records" and "live tombstones." (6) Next, system 500 updates the in-memory index (e.g., a b+ tree-based index) to record the new position of the key in the target slot. (7) If more valid content needs to be copied, system 500 selects a free slot and inserts it before the victim slot in the slot chain and proceed back to (3). (8) System 500 records the end of the GC transaction in the recovery log.

One or more embodiments provides chronological ordering of the data by explicitly ensuring that a garbage collector does not re-order the relative location of the data. Therefore, system 500 stores the data in chronological order without reordering during GC. One or more embodiments have the advantage over conventional systems in that secondary indexing is not needed, and that GC does not need to be turned off, which provides for improving the effective use of available storage capacity.

Figure 11:
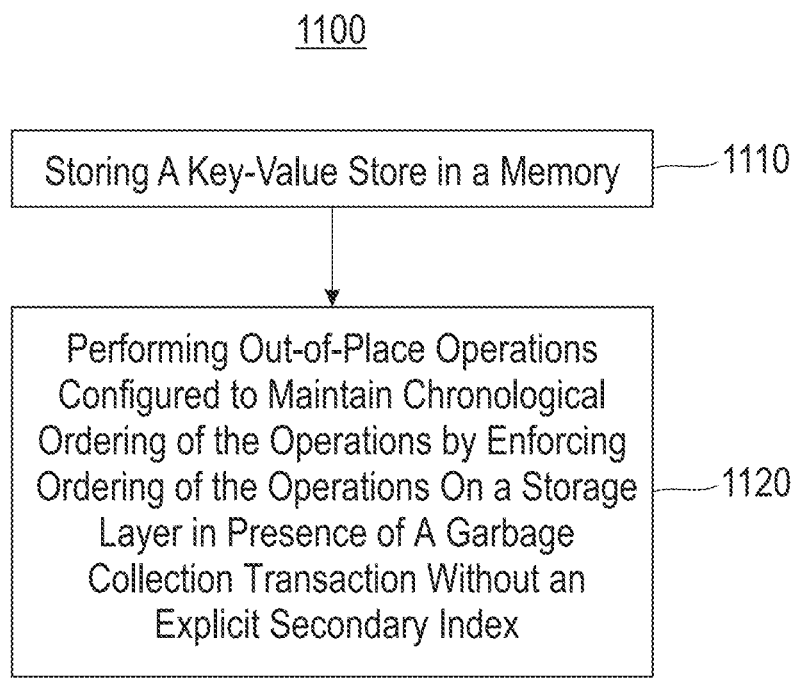
FIG. 11 illustrates a block diagram for a process for chronologically ordered out-of-place updates in a key-value storage system, according to one embodiment.

FIG. 11 illustrates a block diagram for a process 1100 for chronologically ordered out-of-place updates in a key-value storage system, according to one embodiment. In one embodiment, block 1110 in process 1100 includes storing a key-value store in a memory. Out-of-place operations are performed by a processor to maintain chronological ordering of the operations by enforcing ordering of the operations on a storage layer in presence of GC transactional processing without an explicit secondary index.

In one embodiment, in process 1100 the out-of-place operations include update, delete and insert operations. In one embodiment, process 1100 may further include performing a GC transaction to maintain the chronological ordering of the operations by keeping a same relative order of keys copied out of a victim slot as in at least one target slot before the GC transaction.

In one embodiment, process 1100 may include performing a GC transaction to maintain a same relative order of keys copied out of a victim slot as compared to keys in other slots before GC transaction processing. In one embodiment, process 1100 may further include estimating amount of live data in a victim slot, identifying at least one target slot, recording a beginning of a GC transaction in a recovery log, copying valid content from the victim slot to the at least one target slot, placing a tombstone if a record being copied is an update, and updating an in-memory index to record a new position of a key in the target slot. In one embodiment, in process 1100 the tombstone points to where an update back-pointer is pointing to in the victim slot, a back-pointer for entries in the target slot points to the victim slot, and valid content includes live data records and live tombstones.

In one embodiment, process 1100 may further include recording an end of the GC transaction in the recovery log.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a memory device storing a key-value store and instructions; and
   a processor configured to execute the instructions to:
   perform out-of-place operations configured to implicitly maintain chronological ordering of the out-of-place operations by enforcing ordering of the out-of-place operations on a storage layer in presence of a garbage collection transaction without an explicit secondary index; and
   perform the garbage collection transaction to maintain the chronological ordering of the out-of-place operations by keeping a same relative order of keys copied out of a victim slot as in at least one target slot before the garbage collection transaction, wherein the garbage collection transaction must be executed as a complete unit.

2. The system of claim 1, wherein the out-of-place operations comprise: update, delete and insert operations.

3. The system of claim 2, wherein the garbage collection transaction is an individual and indivisible operation.

4. The system of claim 2, wherein the processor is further configured to execute the instructions to:
   perform a garbage collection transaction to maintain a same relative order of keys copied out of a victim slot as compared to keys in other slots before garbage collection transaction processing.

5. The system of claim 1, wherein the processor is further configured to execute the instructions to:
   estimate amount of live data in a victim slot;
   identify at least one target slot;
   record a beginning of a garbage collection transaction in a recovery log;
   copy valid content from the victim slot to the at least one target slot;
   place a tombstone to track previous versions if a record being copied is an update; and
   update an in-memory index to record a new position of a key in the target slot.

6. The system of claim 5, wherein:
   the tombstone points to where an update back-pointer is pointing to in the victim slot;
   a back-pointer for other entries in the target slot points to the victim slot for valid data moved from the victim slot into the target slot; and
   valid content includes live data records and live tombstones.

7. The system of claim 6, wherein the processor is further configured to execute the instructions to:
   record an end of the garbage collection transaction in the recovery log.

8. A method comprising:
   storing a key-value store in a memory;
   performing out-of-place operations configured to implicitly maintain chronological ordering of the out-of-place operations by enforcing ordering of the out-of-place operations on a storage layer in presence of a garbage collection transaction without an explicit secondary index; and
   performing a garbage collection transaction to maintain the chronological ordering of the out-of-place operations by keeping a same relative order of keys copied out of a victim slot as in at least one target slot before the garbage collection transaction,
   wherein the garbage collection transaction must be executed as a complete unit.

9. The method of claim 7, wherein the out-of-place operations comprise: update, delete and insert operations.

10. The method of claim 9, wherein the garbage collection transaction is an individual and indivisible operation.

11. The method of claim 9, further comprising:
    performing a garbage collection transaction to maintain a same relative order of keys copied out of a victim slot as compared to keys in other slots before garbage collection transaction processing.

12. The method of claim 8, further comprising:
    estimating amount of live data in a victim slot;
    identifying at least one target slot;
    recording a beginning of a garbage collection transaction in a recovery log;
    copying valid content from the victim slot to the at least one target slot;
    placing a tombstone to track previous versions if a record being copied is an update; and
    updating an in-memory index to record a new position of a key in the target slot.

13. The method of claim 12, wherein:
the tombstone points to where an update back-pointer is pointing to in the victim slot;
a back-pointer for other entries in the target slot points to the victim slot for valid data moved from the victim slot into the target slot; and
valid content includes live data records and live tombstones.

14. The method of claim 13, further comprising:
recording an end of the garbage collection transaction in the recovery log.

15. A computer program product for chronologically ordered out-of-place updating, the computer program product comprising a computer readable storage medium having program instructions embodied therewith, the program instructions executable by a processor to cause the processor to:
store, by the processor, a key-value store in a memory;
perform, by the processor, out-of-place operations configured to implicitly maintain chronological ordering of the out-of-place operations by enforcing ordering of the out-of-place operations on a storage layer in presence of a garbage collection transaction without an explicit secondary index; and
perform, by the processor, a garbage collection transaction to maintain the chronological ordering of the out-of-place operations by keeping a same relative order of keys copied out of a victim slot as in at least one target slot before the garbage collection transaction,
wherein the garbage collection transaction must be executed as a complete unit.

16. The computer program product of claim 15, wherein the out-of-place operations comprise: update, delete and insert operations.

17. The computer program product of claim 16, wherein the garbage collection transaction is an individual and indivisible operation.

18. The computer program product of claim 16, further comprising program instructions executable by the processor to cause the processor to:
perform, by the processor, a garbage collection transaction to maintain a same relative order of keys copied out of a victim slot as compared to keys in other slots before garbage collection transaction processing.

19. The computer program product of claim 16, further comprising program instructions executable by the processor to cause the processor to:
estimate, by the processor, amount of live data in a victim slot;
identify, by the processor, at least one target slot;
record, by the processor, a beginning of a garbage collection transaction in a recovery log;
copy, by the processor, valid content from the victim slot to the at least one target slot;
place, by the processor, a tombstone to track previous versions if a record being copied is an update; and
update, by the processor, an in-memory index to record a new position of a key in the target slot.

20. The computer program product of claim 19, further comprising program instructions executable by the processor to cause the processor to:
recording an end of the garbage collection transaction in the recovery log,
wherein:
the tombstone points to where an update back-pointer is pointing to in the victim slot;
a back-pointer for other entries in the target slot points to the victim slot for valid data moved from the victim slot into the target slot; and
valid content includes live data records and live tombstones.

* * * * *